United States Patent [19]

Wen

[11] Patent Number: 4,881,260
[45] Date of Patent: Nov. 14, 1989

[54] AUTOMATIC TELEPHONE ANSWERING DEVICE WITH MULTIPLE OUTGOING MESSAGES AND SELECTING MEANS

[75] Inventor: Sayling Wen, Taipei, Taiwan
[73] Assignee: Inventa Electronics Co., Ltd., Taipei, Taiwan
[21] Appl. No.: 133,309
[22] Filed: Dec. 16, 1987
[51] Int. Cl.$^4$ .................. H04M 1/64; H04M 1/65
[52] U.S. Cl. .................. 379/76; 379/70; 379/79
[58] Field of Search .................. 379/70, 74–77, 379/79, 81–82; 360/722, 74.2, 74.4

[56] References Cited

U.S. PATENT DOCUMENTS

| | | | |
|---|---|---|---|
| 4,309,571 | 1/1982 | Chamberlin | 379/75 |
| 4,421,954 | 12/1983 | Mita et al. | 360/74.4 |
| 4,436,959 | 3/1984 | Nakatsuyama et al. | 360/74.4 |
| 4,517,410 | 5/1985 | William et al. | 379/76 |
| 4,710,950 | 12/1987 | Yamamoto | 379/70 |

Primary Examiner—Alan Faber
Assistant Examiner—James E. Tomassini
Attorney, Agent, or Firm—Ladas & Parry

[57] ABSTRACT

An automatic telephone answering device which has multiple outgoing message sections for recording multiple outgoing messages. A selecting means is provided for selecting one outgoing message from multiple recorded outgoing messages to greet calling parties. A user can change the outgoing message easily by setting the selecting switch means instead of recording an entirely new outgoing message. The original outgoing message can be recovered instead of erased after switching to another outgoing message.

9 Claims, 3 Drawing Sheets

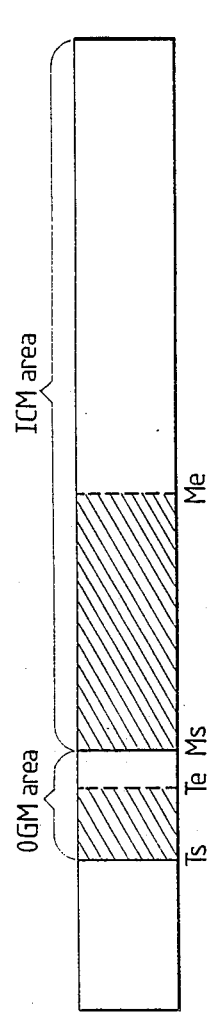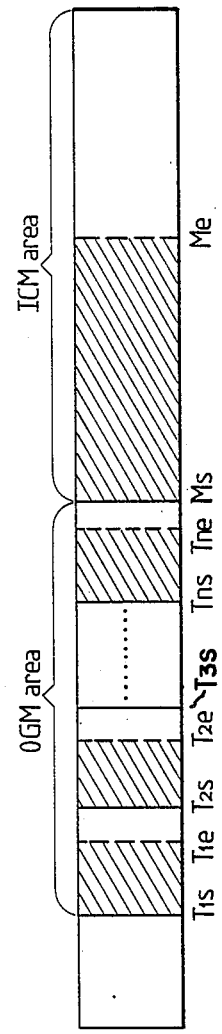

AUTOMATIC TELEPHONE ANSWERING DEVICE WITH MULTIPLE OUTGOING MESSAGES AND SELECTING MEANS

BACKGROUND OF THE INVENTION

1. Field of the Invention

The present invention relates to an automatic telephone answering device, more particularly, to an automatic telephone answering apparatus which has multiple sections in the outgoing message area for recording multiple outgoing messages. According to the user's switch selection, an incoming calling party is greeted with a specific outgoing message which is one of the multiple outgoing messages recorded in the outgoing message area. Corresponding to the effected switch selection, a user can record a plurality of the most frequently used outgoing messages in the multiple sections of the outgoing message area and select the required outgoing message any time by a very easy operation. Compared with conventional telephone answering devices of the type with only one recorded outgoing message, a user of an automatic telephone answering device embodying the present invention doesn't have to spend time recording a new outgoing message which is intended to take the place of an original outgoing message which is considered improper.

2. Brief Description of the Prior Art

As is well known in the art, an automatic telephone answering device is device which automatically engages with a telephone line on receiving an incoming call, sends out an outgoing message to the calling party, and drives a recording unit to record any incoming message received from the calling party. Thereafter, the automatic telephone answering device is set, into a standby mode to wait for the next incoming call. In a conventional automatic telephone answering device, an outgoing message area of a magnetic recording tape is usually used to record an outgoing message which will be played back to a calling party whenever the automatic telephone answering device receives an incoming call. In another conventional device, an outgoing message is played back to all the incoming calling parties, and other supporting messages are played back to a calling party who enters some control codes during or after the playing back period of the main outgoing message.

In these conventional automatic telephone answering devices, if a user wants to change the recorded outgoing message which, for example, is considered unfit by the user, normally the user would proceed to record a new outgoing message which would overwrite the original outgoing message. The procedure of recording a new outgoing message usually takes time to initiate, record and check.

However, because the original outgoing message must be changed whenever a user feels that the content of the original outgoing message can not explain the situation at that moment, the user may feel it is inconvenient to change the outgoing message by repeatedly recording a new message if the situation changes very frequently. But the user doesn't have any choice except to take time to record a new outgoing message again and again, because all the conventional automatic telephone answering devices allow only one outgoing message to be recorded in the outgoing message area and to be played back to all the calling parties. Examples of the conventional automatic telephone answering devices can be seen from U.S. Pat. Nos. 4,309,571 and 4,421,954.

OBJECTS AND SUMMARY OF THE INVENTION

It is therefore a first object of the present invention to provide an automatic telephone answering device which has multiple outgoing message recording sections in its outgoing message area for recording multiple outgoing messages from which a user can select a specific message very easily to greet calling parties in different situations.

It is a second object of the present invention to provide an automatic telephone answering device which has multiple outgoing message sections in its outgoing message area so that a user of this device can keep the original outgoing message for future usage when selecting another outgoing message for greeting the calling parties. It is not necessary for the user to record the original outgoing message again when the original outgoing message is required.

In order to achieve the above objects of the present invention, an outgoing message area including multiple outgoing message sections is provided on the recording medium of the telephone answering device for recording numerous different outgoing messages in the multiple outgoing message sections. Before a user sets the automatic telephone answering device into its standby mode for greeting the calling parties, the user may record the desired multiple outgoing messages into the multiple outgoing message sections by setting a selecting means for accessing the corresponding sections of the outgoing message area and then recording corresponding outgoing messages into the accessed sections. These multiple outgoing messages are considered by the user for greeting the calling parties in different cases.

Thereafter, the user may set the section selecting means to point to any desired one of the multiple outgoing messages, which is most suitable for the current situation, then set this device into a standby mode to wait for any incoming calls. The calling party will be greeted with the outgoing message selected by the selecting means.

After some period, the user may think it is necessary to change the outgoing message previously selected for greeting another outgoing message because the enviromental situation of the user has changed. The user can just set the section selecting means to select another desired outgoing message, instead of recording a new outgoing message, if the desired outgoing message has been considered and recorded before. The time period necessary to select another outgoing message which has already been recorded is quite different from that for recording a new outgoing message. The operation for selecting another recorded outgoing messge by the selecting means is a very simple and time-saving one and is especially useful when the user is in a hurry to finish the changing operations required to select another outgoing message.

Again, when the user feels it is necessary to recover the original outgoing message to greet calling parties, setting the selecting means to the original state will provide the original outgoing message to greet the calling parties. The user doesn't need to waste time in recording the original outgoing message again.

In a preferred embodiment of the present invention, a magnetic tape is used as the recording medium of the automatic telephone answering device. The magnetic tape has an outgoing message area and an incoming message area. A multi-position selection switch is used as the section selecting means to choose an outgoing message section in the outgoing message area of the magnetic tape so that each of a plurality of different outgoing messages may be recorded in each of the outgoing message sections respectively and a specific outgoing message recorded in the selected section may be played back to a calling party.

A detecting means for detecting the revolution of the magnetic tape is provided to send detecting pulses to a control circuit of this device. A memory means is provided in the control circuit of this device for storing the start position and/or end position of each of the multiple outgoing messages. The outgoing message selected to greet the calling party is sent out through the telephone line by playing back the message recorded in the tape from the corresponding start position to the corresponding end position.

These and other objects, features and advantages of this invention will be appreciated from the ensuing description of the preferred embodiments thereof, when read in conjunction with the accompanying drawings.

BRIEF DESCRIPTION OF THE DRAWINGS

FIG. 1 shows a tape format for a conventional automatic telephone answering device;

FIG. 2 shows the tape format used in a preferred embodiment of the present invention, which can record multiple outgoing messages;

DETAILED DESCRIPTION OF THE PREFERRED EMBODIMENTS

Referring to FIG. 1, the magnetic tape format of a conventional automatic telephone answering device which uses a single magnetic tape as a recording medium for recording both the outgoing message (OGM) and the incoming message (ICM) is shown.

The area from a tape position Ts to Ms is formatted as an OGM area for recording an outgoing message. The actual outgoing message occupies tape position Ts to Te. The tape area onwards from Ms is formatted as an ICM area for recording any incoming messages from calling parties. The actual incoming messages will occupy the tape position from Ms to Me.

Because only a single outgoing message is allowed for a conventional automatic telephone answering device, a user must record a new outgoing message, which overwrites the original outgoing message, if a new outgoing message is required. There is no way to retain the original outgoing message together with the new outgoing message.

FIG. 2 shows the magnetic tape format of an automatic telephone answering device according to an embodiment of the present invention. In the OGM area from tape position T1s to Ms, there are n OGM sections which locate from tape position T1s to T2s, T2s to T3s, ...... and Tns to Ms respectively. The actual outgoing messages recorded on the magnetic tape are from tape position T1s to T1e for the first OGM, T2s to T2e for the second OGM, ...... and Tns to Tne for the nth OGM. Although as currently shown in FIG. 2, the space between tape position T1e to T2s, T2e to T3s, .. .... and Tne to Ms are empty, these spaces are available for longer outgoing messages to be recorded. For example, a user can record a new OGM in tape position T1s to T2s instead of the shown first OGM which occupies tape position from T1s to T1e.

The tape position onwards from Ms is left for recording incoming messages. The actual incoming messages occupy tape position Ms to Me.

Figure 3:
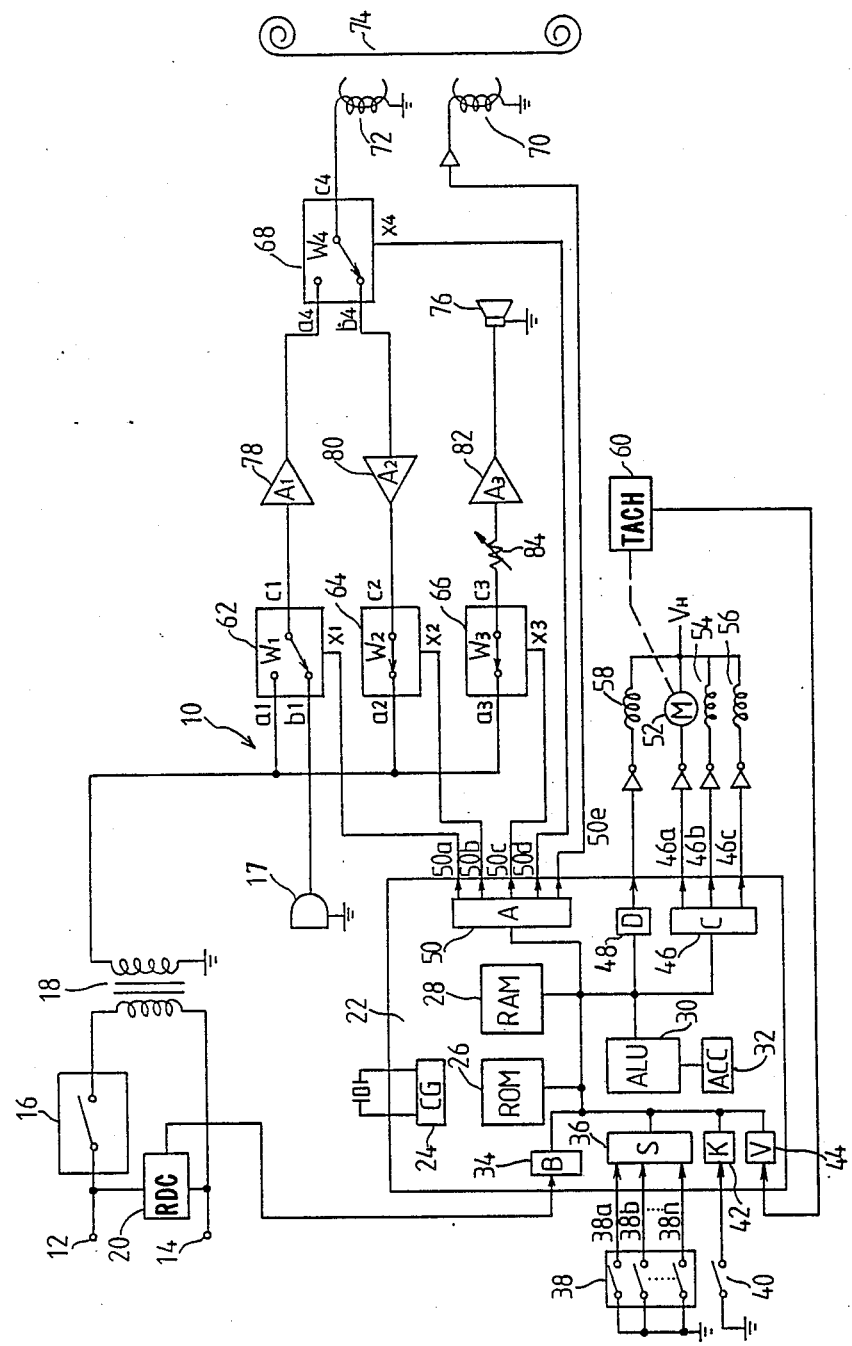
FIG. 3 illustrates a simplified circuit diagram of an automatic telephone answering device according to the present invention.

FIG. 3 shows the circuit diagram of a main part of an automatic telephone answering device according to a preferred embodiment of the present invention. The automatic telephone answering device is generally designated by reference numeral 10. Symbols 12 and 14 are telephone lines, symbol 16 represents a pair of contacts of a line relay, and symbol 18 represents a line transformer which couples the voice signal between telephone lines 12, 14 and this device 10. A ring detecting circuit 20 is shown in FIG. 3 as connected between telephone lines 12 and 14 for detecting a ringing signal from telephone lines 12 and 14 and for sending a detecting signal to a control circuit 22.

Figure 4:
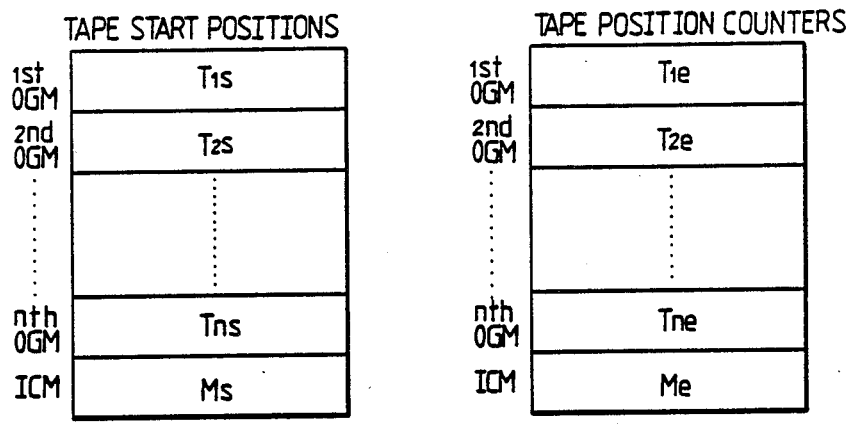
FIG. 4 shows memory arrangements for storing the tape start positions and tape end positions of the multiple outgoing message sections.

The control circuit 22 is the center of this device 10 and comprises a microprocessor or equivalent circuit element which includes a clock generator circuit (CG) 24 for generating the time base necessary for the operation of control circuit 22, a read only memory (ROM) 26 for storing a program required to execute operations of this device 10, a random access memory (RAM) 28 for storing data and status used for executing operations of this device 10, an arithmetic logic unit (ALU) 30 for executing logic operations and calculations, an accumulator (ACC) 32 for tentatively storing data generated from logic operations and calculations, and a set of input/output ports for supporting the system operation of control circuit 22. RAM 28 includes a memory 15 space for storing the end positions of the multiple OGMs, and such a memory space is shown in FIG. 4.

An input port 34 receives a ring detecting signal from ring detecting circuit 20. Whenever a ringing signal comes in from telephone line 12 or 14, the input of port 34 changes from a low level to a high level.

An input port 36 is connected to a selecting switch circuit 38. There are n different selecting inputs from selecting switch circuit 38, which are designated as 38a, 38b, ..... and 38n. At one time, only one among these n selecting inputs is connected to a ground potential to select a corresponding one from the n available outgoing messages.

An input port 42 is connected to a REC key 40 which is used to initialize and stop the recording procedure for recording outgoing messages. Whenever the REC key 40 is pressed, the input port 42 changes from a high to a low level.

An output port 46 is used to control the operation of a tape driving mechanism. Pin 46a is used to drive a tape driving motor 52. If a low level appears at pin 46a, motor 52 is stopped. If a high level appears at pin 46a, motor 52 is enabled to revolve. Pin 46b is used to control a solenoid 54. If a low level appears at pin 46b, solenoid 54 is not activated, and then motor 52 revolves with a normal speed. If a high level appears at pin 46b, solenoid 54 is activated to cause motor 52 to revolve at a fast speed. Pin 46c is used to control a solenoid 56 which is used to determine the revolving direction of motor 52. If a low level appears at pin 46c, solenoid 56 is not activated and then motor 52 revolves in its forward direction. If a high level appears at pin 46c, solenoid 56 is activated to cause motor 52 to revolve in a backward direction.

An output port 48 of control circuit 22 is used to control a solenoid 58 for opening or closing the pair of contacts 16 of the line relay. When port 48 is low, the pair of contacts 16 is opened. When port 48 is high, the pair of contacts 16 is closed.

An output port 50 has pins 50a, 50b, 50c, 50d and 50e which are used to control analog switches 62, 64, 66 and 68 and an erase head 70 respectively. If pin 50a is low, analog switch 62 has its contacts c and b connected. If pin 50a is high, analog switch 62 has its contacts c and a connected. If pin 50b is low, analog switch 64 has its contacts c and a disconnected. If pin 50b is high, analog switch 64 has its contacts c and a connected. If pin 50c is low, analog switch 66 has its contacts c and a disconnected, while analog switch 66 has its contacts c and a connected if pin 50c is high. If pin 50d is low, analog switch 68 has its contacts c and b connected, which analog switch 68 has its contacts c and a connected if pin 50d is high. If pin 50e is low, the erase head 70 is not activated. If pin 50e is high, erase head 70 is activated. 15 Referring again to FIG. 2, the magnetic tape of this device is formatted generally into an ICM area and an OGM area. The OGM area includes n OGM sections from tape position T1s to T2s, from T2s to T3s, . . . . . . and from Tns to Ms. The actual outgoing messages recorded by the user are allowed from T1s to T2s, from T2s to T3s, . . . . . . and from Tns to Ms, but it is not necessary to fill all spaces of each of these OGM sections with respective outgoing messages.

In this device, the tape positions T1s, T2s, T3s, . . . . . . . Tns and Ms could be stored in ROM 26 or RAM 28 of the control circuit 22. If these tape positions are stored in ROM 26, these data are not able to be modified by any means. While if these tape positions are stored in RAM 28, they are able to be modified by the user or by this device automatically.

Before greeting a calling party, a user should record the desired outgoing messages on the magnetic tape. There are n positions available in the selecting switch circuit 38 for recording n outgoing messages. Provided that the user wants to record an OGM in the first OGM section from T1s to T2s, the terminal 38a of selecting switch circuit 38 is grounded. Then the user presses REC key 40 to start a recording procedure.

After control circuit 22 senses that input port 42 is low, it checks the state of input port 36 and finds out that the input 38a is grounded. The control circuit 22 then prepares to record by moving tape 74 (FIG. 3) from any position to T1s. The moving operation of the tape position is achieved by changing the output state of pin 46a to high to start the revolution of motor 52 and also changing pin 46b to high to cause motor 52 to revolve at its fast speed. As to the output state of pin 46c for determining forward or backward direction, it will depend on the position where the tape 74 is before being moved. If the current tape position is before T1s, then a forward direction movement is necessary. If the current tape position is beyond T1s, then a backward direction movement is chosen. If the current tape position is right at T1s, there is no movement necessary at all. A revolution detector or tachometer 60 is provided in this device 10 for gathering the information about the tape position.

After moving the tape position to T1s, this device 10 changes from a moving state to a recording mode. The erase head 70 is activated by a signal supplied by pin 50e during the recording operation to erase the originally recorded messages.

The motor 52, enabled by a high level output of pin 46a, revolves in a normal speed due to a low level output of pin 46b, and revolves in its forward direction due to a low level output of pin 46c. The contacts c and b of analog switch 62 are connected by a high level output of pin 50a. The analog switch 68 has its contacts c and a connected due to a high level output of pin 50d. The user then may speak to a microphone 17. The voice signal is sent from microphone 17 through analog switch 62, an amplifier 78, and analog switch 68 to a play-back/record (P/R) head 72 by which the voice signal is recorded on tape 74. During the recording procedure, REC key 40 is continuously pressed. The user may stop the recording procedure by releasing the REC key 40. During the recording procedure, a series of pulses are generated from revolution detector 60 due to the revolving action of motor 52. The control circuit 22 checks the revolution of tape 74 at an input port 44 to which the pulses generated by detector 60 are sent.

After the user releases the REC key 40 to stop the recording procedure, motor 52 is stopped due to a low level output of pin 46a. The current tape position checked by control circuit 22 according to the start position T1s of the first OGM and the revolution detecting pulses of detector 60 is recognized as an end position T1e of the first OGM, which is then stored in a memory space (i.e. the tape position counter shown in FIG. 4) of RAM 28.

The analog switch 68 is controlled by a low level output of pin 50d and causes its contacts c and b to connect after the recording operation is stopped. The user can record additional outgoing messages into the other OGM sections by setting the switch circuit 38 to other selecting positions and proceeding with the additional recording procedures.

Provided that the end positions for these additional outgoing messages are: T2e for the second OGM, T3e for the third OGM, . . . . . . and Tne for the nth OGM. As shown in FIG. 4, the tape positions T1s, T2s, T3s, . . . . . . Tns and Ms are stored in either ROM 26 or RAM 28. The tape positions T1e, T2e, . . . . . . . and Tne are stored in the tape position counter area of RAM 28.

After finishing the operation of recording all of the desired outgoing messages, this device can be set into a standby mode by the user to wait for any incoming call with the selecting switch circuit 38 being set by the user to a desired selection position. When a ring signal is detected by the ring detecting circuit 20, a detecting signal is sent from circuit 20 through input port 34 to control circuit 22. The control circuit 22 then changes the output state of control port 48 from a low level to a high level to close the contacts 16 of said line relay. The control circuit 22 also checks the pre-selecting state of the switching circuit inputs 38a, 38b, . . . . . . and 38n. The control circuit 22 will move the tape 74 from any current position to a corresponding OGM start tape position according to the checked selecting state. For example, if input port 38b is grounded, the tape 74 will be moved to tape position T2s for accessing the second OGM.

After moving the tape position to the corresponding start position of a desired OGM, motor 52 is enabled to revolve in its forward direction at a normal speed. The output of pin 46a is high, pin 46b is low, and pin 46c is low. The analog switch 64 is set by a high level output of pin 50b to have its contacts c and a connected. The analog switch 66 is set by a high level output of pin 50c to have its contacts c and a connected. The analog switch 68 is set by a high level output of pin 50d to have its contacts c and b connected. The P/R head 72 is activated to pick up the selected outgoing message from tape 74. The signal from P/R head 72 is sent through analog switch 68, an amplifier 80, analog switch 64, and transformer 18 to telephone lines 12, 14 for greeting the calling party.

The control circuit 22 checks the pulses from the revolution detecting circuit 60 and calculates the tape position. If the tape position is the same as the end position of the corresponding outgoing message stored in the tape position counter (shown in FIG. 4), then this device will stop sending the corresponding outgoing message to the calling party.

Thereafter, this device changes from the OGM playing back mode to a fast forward mode to move tape 74 to a point beyond the tape position of the last ICM and then records the incoming message from the calling party into the tape position beginning from the end position of the last ICM. Due to the fact that the fast forward mode operation and the ICM recording operation are well known in the art, it is not intended to describe the details of these operations in this disclosure.

Explained as follows is an example to show the convenience and advantages of multiple outgoing messages over the conventional single outgoing message technique. A user of the automatic telephone answering device according to the present invention may have the following four most frequently used messages recorded in this device. These messages are:

(1) First OGM: We are not available to receive your call right now. Please leave your message and telephone number after the beep. We will call you back soon.

(2) Second OGM: We are out for lunch now. Please call again after 1:00 PM.

(3) Third OGM: We are at other telephone number now. Please call telephone number AAA-AAAA.

(4) Fourth OGM: We have closed the office for the day. Please call again tomorrow.

The first OGM is a general message which is applicable, generally speaking, to any different conditions. But in other cases, the user would like to have the convenience of using a different outgoing message to further explain the present situation. So the second outgoing message is often (or daily) used for lunch time, while the third outgoing message is often used when the user can be reached at another telephone number, and the fourth outgoing message is used after office hours. There are still many other OGM cases that can be used for different users, but the convenience and advantage is that the user doesn't need to record new messages again but simply needs to change the switch position to select another recorded OGM. The original OGM can be recovered instead of being erased as done in the conventional telephone answering devices.

Figure 5:
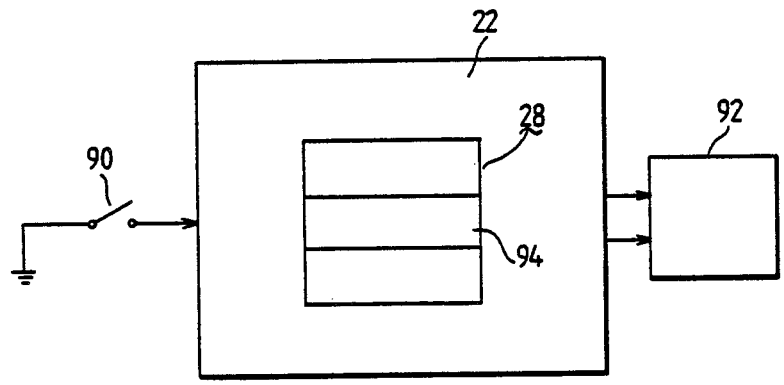
FIG. 5 illustrates an alternative arrangement of the section selecting means used in this invention.

Each of the switch positions 38a to 38n of the selecting switch circuit 38 as shown in FIG. 3 is used to select one of n recorded outgoing messages. Because various selecting means can be applied to select one from the n recorded outgoing messages, the selecting means for this device should not be limited to the manner described above. For example, as shown in FIG. 5, a pushbutton selecting key 90, a display 92 and a message counter 94 can be used to construct another selecting means instead of the switch circuit 38.

The selecting key 90 is a key connected to an input port of control circuit 22. Whenever key 90 is pressed one time, the message counter 94 in RAM area 28 of control circuit 22 is increased by one. The increasing sequence of message counter 94 is from 1 to 2, from 2 to 3, . . . . . . and from n to 1. The content of message counter 94 will be shown on the display 92 for a user's check. Whenever the control circuit 22 wants to access a desired OGM section of tape 74, it checks the value contained in message counter 94 if selecting key 90, display 92 and message counter 94 are provided.

As to the recording medium for the outgoing messages, there are other available types of media which can be used in the automatic telephone answering device according to the present invention. For example, some conventional telephone answering devices have been known to use solid state memory IC chips to record their OGM. Even in the type which uses magnetic tape as the recording medium, there are available telephone answering devices which use two tapes for recording incoming messages and outgoing messages respectively. So the keypoint of the present invention is to provide a selecting means for selecting one of a multitude of outgoing messages for greeting the calling parties. This selecting means can save a user time when changing an outgoing message or recovering the original outgoing message. This selecting means can be applied to a telephone answering device of the type in which any kind of medium is used for recording outgoing messages.

Although illustrative embodiments of this invention have been described in detail hereinabove with reference to the accompanying drawings, it is to be understood that this invention is not limited to those precise embodiments, and that various changes and modifications can be effected therein by one skilled in the art without departing from the scope and spirit of this invention as defined in the appended claims.

What I claim Is:

1. An automatic telephone answering device having an outgoing message recording operation mode and an automatic answering operation mode, comprising:
   ring detecting circuit means for detecting an incoming call and generating a signal when an incoming call is detected;
   phone line coupling means responsive to said signal generated by said ring detecting circuit means for connecting the device to a phone transmission line;
   a recording medium having an outgoing message recording area which is divided into multiple sections, each of said outgoing message sections having a start position and an end position and being adapted to record one of a plurality of outgoing messages required for explaining different situations;
   transducer means for recording messages on said recording medium or picking up the recorded messages therefrom;
   drive means for advancing said recording medium relative to said transducer means with either a normal or a fast speed in either a forward or a backward direction;
   selecting means for selecting one of said multiple outgoing message sections in order to record by said transducer means a specific outgoing message in said selected one section or play back by said transducer means a specific outgoing message prerecorded in said selected one section such that a plurality of specific outgoing messages can be recorded respectively in said multiple outgoing message sections of said outgoing message recording area of said recording medium and a calling party can be greeted with one of the specific outgoing messages recorded in said selected section; and control circuit means including memory means for storing said start position and end position of each of said outgoing message sections, said control circuit means being coupled to said ring detecting circuit means, said phone line coupling means, said transducer means, said drive means, and said selecting means and being programmed so that:

said outgoing message recording operation mode, when a user actuates said selecting means to select one of said outgoing message sections for recording a specific outgoing message, said control circuit means enables said drive means to advance said recording medium with a fast speed to the start position of said selected section and then enables said transducer means to record said specific message in said selected section while said drive means is enabled to continue to advance said recording medium with a normal speed until the end position of said selected section is arrived, and during said automatic answering operation mode, when an incoming call is received, as soon as said phone line coupling means has coupled this device to the phone transmission line in response to the signal generated by said ring detecting circuit means, said control circuit means enables said drive means to advance said recording medium with a fast speed to the start position of a specific outgoing message section pre-selected through said selecting means by the user, causes said transducer means to play back the outgoing message recorded in the selected section to the calling party while said drive means is actuated to continue to advance said recording medium with said normal speed until the end position of said selected section has arrived.

2. An automatic telephone answering device as claimed in claim 1, wherein said recording medium further including an area for recording incoming messages, and said automatic answering operation mode further includes an incoming message recording operation, and wherein after the end position of said selected section is arrived during said automatic answering operation mode said control circuit means causes said drive means to advance said recording medium with said fast speed to its incoming message recording area for executing said incoming message recording operation.

3. An automatic telephone answering device as claimed in claim 1, wherein said control circuit means is further programmed so .that during said automatic answering operation mode, when the end position of said selected outgoing message section has arrived, said control circuit means enables said drive means to advance said recording medium with its fast speed in its backward direction relative to said transducer means to the start position of said selected outgoing message section, whereby when a subsequent incoming call is received, the subsequent calling party will be greeted directly with said selected outgoing message.

4. An automatic telephone answering device as claimed in claim 2, wherein said control circuit means is further programmed so that during said automatic answering operation mode, after said incoming message recording operation has been completed, said control circuit means enables said drive means to advance said recording medium with its fast speed in its backward direction relative to said transducer means to the start position of said selected outgoing message section, whereby when a subsequent incoming call is received, the subsequent calling party will be greeted directly with said selected outgoing message and then an operation for recording the incoming message left by the calling party is executed.

5. An automatic telephone answering device as claimed in claim 1, wherein said memory means of said control circuit means includes ROM means for storing the start position of each of said outgoing message sections and RAM means for storing the end position of each of said outgoing message sections.

6. An automatic telephone answering device as claimed in claim 1, wherein said selecting means is a multi-position selecting switch having a first common terminal connected to a voltage source and a plurality of second terminals connected to said control circuit means, the number of said second terminals corresponding to the number of said outgoing message sections.

7. An automatic telephone answering device as claimed in claim 1, wherein said selecting means includes a push-button type key having a first terminal connected to a voltage source and a second terminal, and counting means incorporated in said control circuit means and connected to said second terminal of said push-button key such that every time said key is pressed the content of said counting means is increased by one; and wherein said control circuit means is so programmed that, via checking the content of said counting means, said control circuit means determines that a specific outgoing message section corresponding to the content of said counting means is selected to be used to record an outgoing message therein during said outgoing message recording operation mode or is selected to play back the outgoing message recorded therein.

8. An automatic telephone answering device as claimed in claim 7, wherein said selecting means further includes display means connected to said counting means for displaying the content of said counting means.

9. An automatic telephone answering device as claimed in claim 1, further including medium position detector means coupled to said control circuit means and said drive means for determining the position, to which said recording medium is advanced, by monitoring the operation of said drive means and for supplying the determined position information to said control circuit means such that said control circuit means may recognize the current position of said recording medium and store the current position information in said memory means as said start position or end position of each of said outgoing message sections.

* * * * *